(12) United States Patent
Lancho Doncel (10) Patent No.: US 7,922,125 B2
(45) Date of Patent: Apr. 12, 2011

(54) LAUNCHING VEHICLE AND SATELLITE CONNECTION-SEPARATION APPARATUS

(75) Inventor: Miguel Lancho Doncel, Madrid (ES)

(73) Assignee: EADS Casa Espacio S.L., Madrid (ES)

( * ) Notice: Subject to any disclaimer, the term of this patent is extended or adjusted under 35 U.S.C. 154(b) by 0 days.

(21) Appl. No.: 11/294,679

(22) Filed: Dec. 5, 2005

(65) Prior Publication Data

US 2007/0080260 A1    Apr. 12, 2007

(30) Foreign Application Priority Data

Oct. 6, 2005    (ES) ................... PCT/ES2005/070140

(51) Int. Cl.
*B64G 1/64* (2006.01)

(52) U.S. Cl. .................. 244/173.1; 244/159.4; 102/377

(58) Field of Classification Search ............... 244/159.4, 244/158.2, 172.4, 173.1, 172.9; 285/407; 102/377

See application file for complete search history.

(56) References Cited

U.S. PATENT DOCUMENTS

| | | | | |
|---|---|---|---|---|
| 3,505,925 A | * | 4/1970 | Carr | ................................ 89/1.1 |
| 3,608,848 A | * | 9/1971 | Cantor et al. | .............. 244/172.4 |
| 4,715,565 A | * | 12/1987 | Wittmann | ................... 244/173.1 |
| 5,318,255 A | * | 6/1994 | Facciano et al. | ........... 244/158.1 |
| 5,411,349 A | * | 5/1995 | Hornung et al. | .............. 403/338 |
| 5,743,492 A | * | 4/1998 | Chan et al. | ................... 244/118.2 |
| 6,076,467 A | * | 6/2000 | Cespedosa et al. | ........... 102/378 |
| 6,343,770 B2 | * | 2/2002 | Holemans | .................. 244/173.3 |
| 6,357,699 B1 | * | 3/2002 | Edberg et al. | ............... 244/173.3 |
| 6,454,214 B1 | * | 9/2002 | Smith | ........................ 244/173.1 |
| 6,648,543 B2 | * | 11/2003 | Arulf | ............................ 403/334 |
| 6,679,177 B1 | * | 1/2004 | Wu et al. | ........................ 102/377 |
| 6,702,338 B2 | * | 3/2004 | Vanasse | ........................ 285/407 |
| 6,712,542 B2 | * | 3/2004 | Buder | ........................ 403/374.2 |
| 2006/0145016 A1 | * | 7/2006 | Renfro | ........................ 244/158.1 |

FOREIGN PATENT DOCUMENTS

JP    2005343311 A    *   12/2005

* cited by examiner

*Primary Examiner* — Benjamin P Lee
(74) *Attorney, Agent, or Firm* — Ladas & Parry LLP (57) ABSTRACT

A launcher and satellite connection-separation apparatus for launching and satellite vehicles has a band-clamp assembly of a band with an inner channel in which clamps are located in a sliding manner for application to rings interfacing between the vehicles, and a union-separation device on ends of the band for radially tightening the band and controlling opening of the band in first and second phases such that the ends of the band shift in contact with the rings for dissipating by friction elastic energy corresponding to the tightening of the band and separate from the rings until reaching a parking position.

12 Claims, 8 Drawing Sheets

LAUNCHING VEHICLE AND SATELLITE CONNECTION-SEPARATION APPARATUS

FIELD OF THE INVENTION

The present invention refers to a launching vehicle and satellite connection apparatus which must separate when reaching the suitable altitude, in which the connection is performed by means of a tightened band with a plurality of clamps acting upon the satellite and the launcher interface rings, and in which the separation is carried out by means of an electrically transmitted command which activates the opening mechanism of the band.

More particularly, the present invention refers to a launching vehicle and satellite connection-separation apparatus in which the disturbance caused by the opening of said band is reduced to the minimum.

BACKGROUND

Since the beginning of the development of technologies for carrying loads to outer space many connection and separation systems have been developed for the different structures or phases which make up a carry vehicle and particularly for that which joins the latter to its payload or satellite. Connections based on pyrotechnic strings or explosive bolts are effective and reliable but they generate high levels of vibratory disturbance or shocks which move along the whole vehicle until reaching the most sensitive elements. Thus these kinds of connections are reserved for vehicle phase separations which are far from the satellite. In order to separate the satellite, systems are needed which, while maintaining their joining effectiveness, do not produce disturbing effects on separation such as those described.

Connection-separation elements have been developed based on preloading a joining support by means of a cable or bolt which is subsequently cut with a pyrotechnic cutter or thermal knife, or rather two previously cut ends are separated with a pyrotechnic nut or an electromechanical nut. These and other similar devices are effective for joining-separating lightweight structures such as antennas or solar panels, but they are not the most adequate for joining large structures with cylindrical interfaces. In these cases it would be required to arrange in a circle either many of these discrete elements with the resulting reduction in reliability, or few of them with the resulting increase in connection loads.

One of the most effective systems being used for joining large structures with symmetry of revolution is that based on a connection referred to as "Marman Clamp Band" consisting in a set of wedge or V-shaped clamps which are preloaded against the interface rings of the structures to be joined, also V-shaped, by means of the action of an elastic band which is tightened around the clamps. The main advantage of this system with respect to those previously described is that the preload is performed in a continuous manner around the structure without local overloads and with an effectiveness factor which is increased due to the wedge effect. In contrast, the disadvantage is that this very uniform preload causes elastic deformation, with axial symmetry, of the interface rings which, when suddenly relaxed, transforms into kinetic energy of the elemental masses of those rings, that is, in a vibratory signal of high acceleration at the natural frequency corresponding to that symmetrical mode. Therefore, the undesired shock is again obtained.

Systems based on prior technology normally used two tension band halves joined by two bolts to be cut by two pyrotechnic elements. This arrangement with a plane of symmetry slightly improves the generation of disturbance by reducing the excitability of the axial symmetry vibration mode, but still maintains a great capacity for exciting these modes, even more so taking into account that steel bands with a small cross section and at high tension, that is, very stretched, are used and therefore tension relaxation is very fast and very symmetrical. To get an idea, a band tightened to 30 KN around an interface of slightly more than 1 m in diameter, generates shocks with accelerations of up to 5000 G's.

Subsequently, a new device of the band-clamp type has been developed, object of Spanish patent no. 2 131 476, which will be referred to hereinafter as "CRSS", which reduces the induced shock to values under 2000 G's for the same parameters as above. To that end it reduces the two opening spots to one, which translates into a deceleration of the separation speed of the band with respect to the interface rings, remaining in contact for longer before distancing itself from them and consequently delaying the start of free vibration of these rings. Furthermore, the system modifies the criterion for band design, which becomes an aluminium band with a great cross-section, considerably increasing rigidity and therefore its load-bearing effectiveness, together with the reduction of elastic energy accumulated on the band itself when tightened. Despite these advantages, the relaxation command is still instantaneous as it is based on cutting the bolt which joins the separation terminal by means of a pyrotechnic cutter, and the relaxing time is not controlled, depending only on the friction forces with the interface and on the system dynamics.

Another device has been recently developed with the capacity to control this relaxation time, referred to as "CBOD" (a band developed by SAAB ERICSSON and a STARSYS controlled opening mechanism). This system incorporates the band opening on a single end, such as the CRSS, and adds an energy braking and absorption mechanism. The mechanism acts upon the system opening by means of retaining two screws located at the two terminals. These screws are forced to pass through a thread associated to reaction wheels. The band tension transmitted to the screws forces a rotational movement of the reaction wheels in order for the band to free itself from them. The rotational kinetic energy induced in the wheels is that which allows slowing down the system. With this system shock acceleration is reduced to values of less than 1000 G's for tensions of 60 KN.

The drawback of this system is the loss of reliability due to its requiring the complete and simultaneous release of the screws in order to ensure the separation of the band from the ring interface. Furthermore, as the band tension relaxes, the energy available for withdrawing the screw is less and therefore the safety margin for the deployment decreases. The system maintains the Marman-type band elasticity values which requires a great screw path within the reaction wheel, which is greater for larger interface diameters. On the other hand screw size may be critical when directly supporting band tension, that is, as the need to carry larger loads increases, achieved by increasing band tension, the loads passing directly through the mechanism are greater.

The system proposed by Huessler described in U.S. Pat. No. 5,157,816 solves many of the problems described above, at the same time improving separation performance with the proposed controlled opening mechanism. The mechanism it proposes contains a bolt which is made to work by compression, instead of by traction as in the cases described above. This is achieved by extending the ends of the band beyond the meeting point and joining them to the ends of the bolt by means of two articulations. The band tension is transformed into compression in the bolt and cutting the bolt is not required in order to open the system, but only getting the system out of the unstable equilibrium. This is achieved by installing the system in an unstable position with a tendency to opening and retaining it with any pyrotechnic or electromechanical device which will release it. The main advantage of this system is that a spring is added which slows down the rotational movement of the bolt during opening. This braking spring can be tuned to the system requirements. Furthermore, as the system opens, the tension required to continue opening decreases, the safety margin therefore increasing. The disadvantage of the system is that it requires the very mechanism in order to perform the tightening. In fact the mechanism itself is proposed as a tightening system, which makes the starting position of the mechanism have some uncertainty related to the results of commissioning it, which leads to a lack of assurance in performance reproducibility.

The present invention is aimed at solving the problems set forth and improving the general performance of these systems, both in that regarding the features and in that referring to commissioning them.

SUMMARY OF THE INVENTION

The present invention proposes a launching vehicle and satellite connection-separation apparatus which, like known apparatuses, comprises a band with an inner channel in which a plurality of clamps are located in a sliding manner, which is applied on the rings making up the joining interface between both vehicles and is provided with a union-separation device of the ends thereof, including a locking element thereof and means for unlocking it, and which in contrast to known apparatuses:

also comprises means for radially tightening the band-clamps assembly.

The union-separation device also comprises a mechanism allowing a controlled opening of the band in two phases, in the first of which the ends of the band shift, keeping in contact with the rings, the elastic energy corresponding to the tightening of the band being dissipated, and in the second of which the band separates from the rings until reaching its parking position.

An object of the present invention is to minimise the shock induced by the separation of a tightened band on the structures it joins resulting from the sudden release of the elastic energy accumulated during tightening. The controlled opening mechanism mentioned dissipates a good part of the energy before the effective separation of the band from the structures and therefore the resulting shock will only be that induced by the residual energy.

The dissipating mechanism in turn has a simple working principle: when starting the separation, part of the accumulated elastic energy is used to move a mass (transforming it into kinetic energy) and the band is simultaneously forced not to separate from the structures it joined, that is, to move tangentially thereto without losing contact and rubbing (with the resulting transformation into heat energy) thereby obtaining a reduction of the residual energy at the time of effective separation.

It must also be taken into account that in the entire separation of the band, caused by the release of the locking element by means of, for example, the breaking of a lock bolt by means of a pyrotechnic cutter, a shock is induced which is added to the one explained above (more important at high frequencies). In the apparatus according to the invention the tension to be supported by the locking element, such as a lock bolt, is reduced by means of a lever system or the like, which allows using an unlocking element such as a cutter of less energy and the shock transmitted to the satellite is therefore reduced.

In other words, this mechanism forces the terminals of the band to perform a low speed and preferably tangential initial movement, and a high speed and preferably radial subsequent movement.

This controlled opening mechanism adds to a Huessler-type system of elements, linked such that they force the kinematics of the release, suitably delaying it, a system of slowing the kinematics by transforming it into translational kinetic energy of an element equivalent to Huessler's bolt but having a large mass, which considerably improves performance. On the other hand the problem of reliability related to the need of the complete and simultaneous release of the screws in CBOD is solved.

Another object of the present invention is to avoid coupling of the start-up of the opening-closing mechanism and the start-up of the band, which is achieved by using means such as push bars for radially tightening the band-clamps assembly. These push bars located between the band and the clamps rest on the band and push the clamps against the interface rings, which causes the preloading of the clamps on these rings.

This implies carrying out the apparatus in a completely different manner to all known systems. In known systems band tightening causes the preloading of the clamps. In the present invention the opposite occurs, that is, the invention starts by giving the clamps the necessary preload, the tension resulting from this. The problem of the design criteria for the controlled opening mechanism and the band being uncoupled such as in the CBOD mechanism is thus solved, but maintaining and improving the advantages of the Huessler mechanism as well as the problem of tightening limitations due to performance loss caused by the friction between the clamps and the band.

Other features and advantages of the present invention will be gathered from the following detailed description of an illustrative embodiment of its object with respect to the figures attached.

DETAILED DESCRIPTION OF THE PREFERRED EMBODIMENTS

Figure 1:
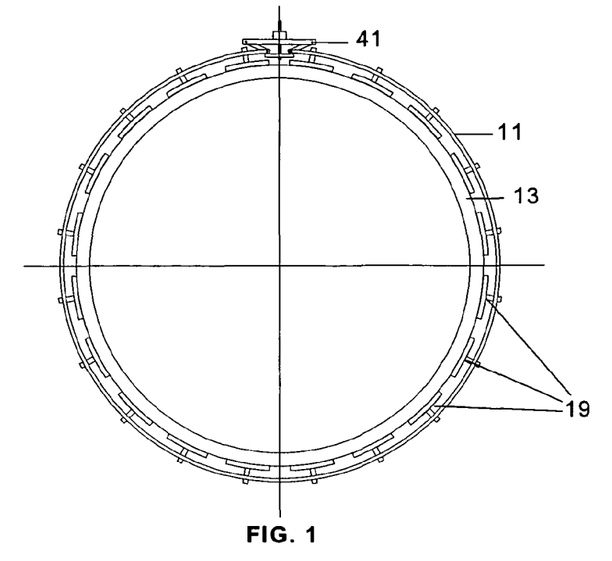
FIG. 1 shows a schematic plan view of a launcher vehicle and satellite connection apparatus according to the present invention.

As has been mentioned, the present invention is focused upon two elements which are shown schematically in FIG. 1: a controlled opening mechanism included in the opening-closing device 41 of the band 11 which allows reducing the shock induced by the separation of the band and a tightening mechanism of the band 11-clamps 13 assembly by means of push bars 19 for the clamps 13, which allows supporting larger satellites which are completely uncoupled and which may accordingly be designed independently to one another according to their own functional requirements, and which when joined continue to perform their functionality without disturbing each other.

Figure 2:
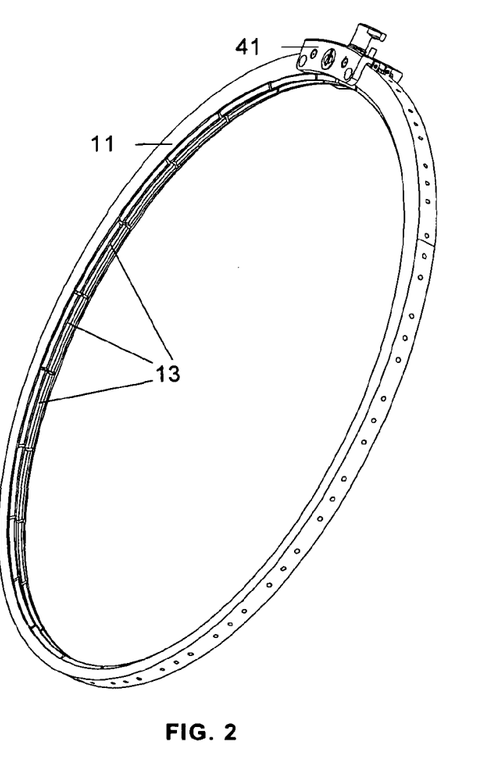
FIG. 2 shows a perspective view of launching vehicle and satellite connection apparatus according to the present invention.
Figure 3A:
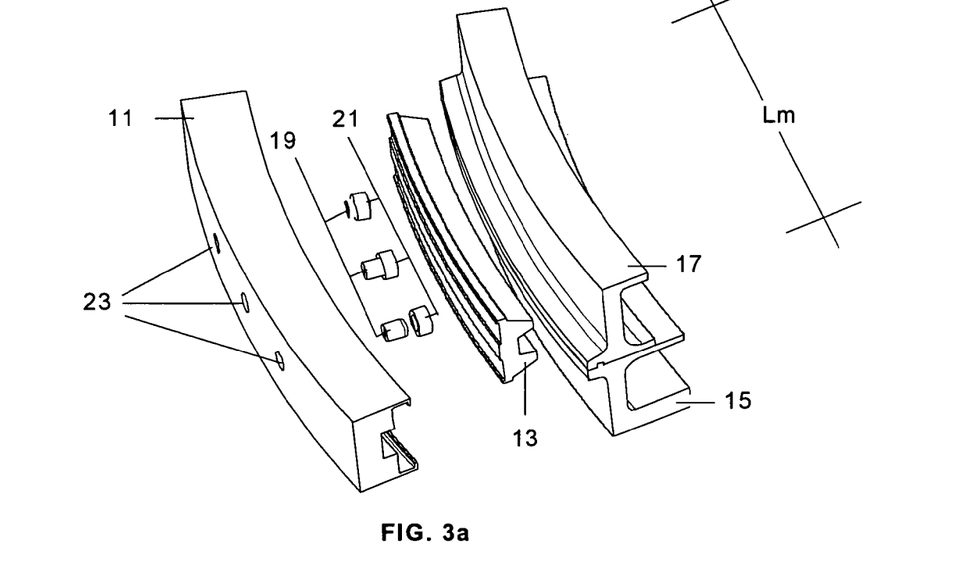
FIGS. 3a, 3b and 3c show different views of the assembly of a launching vehicle and satellite connection apparatus according to the present invention.
Figure 3B:
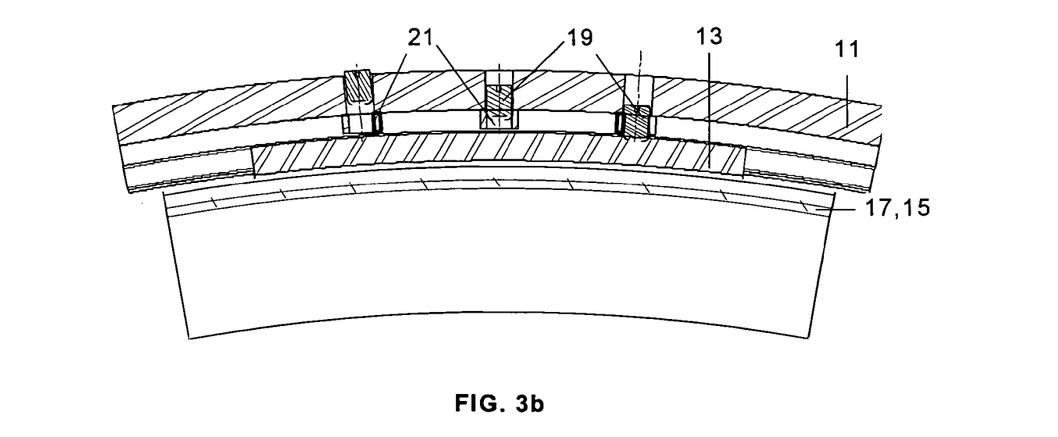
Figure 3C:
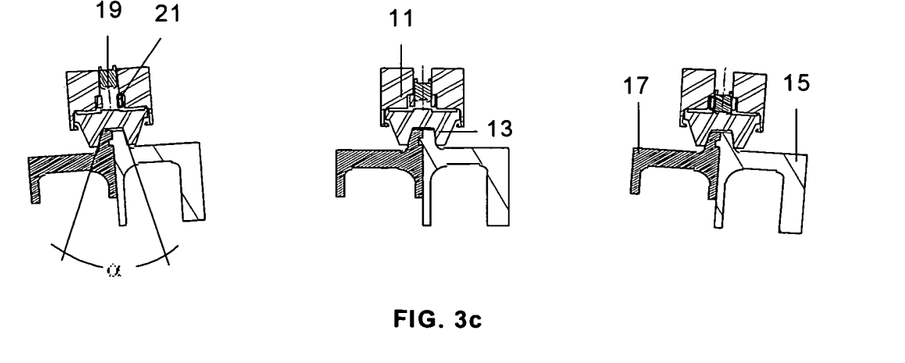
Figure 4:
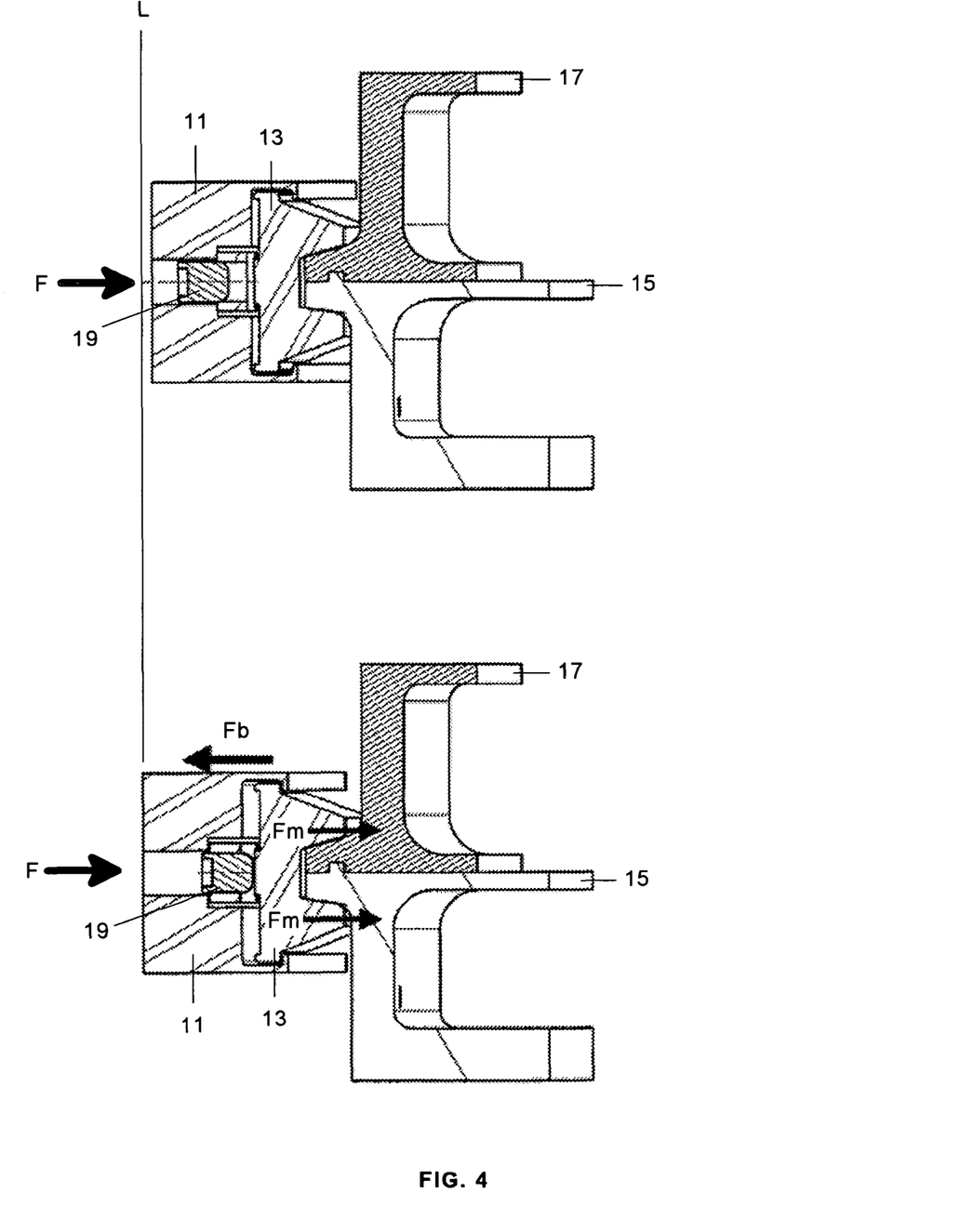
FIG. 4 shows two section views of a launching vehicle and satellite connection apparatus according to the present invention assembled on interface rings before and after applying radial tension.

An embodiment of the tightening mechanism of the band 11-clamps 13 assembly will be first described in reference to FIGS. 2-4.

The band 11-clamps 13 assembly is designed such that it is capable of providing the maximum joining capacity of the launcher 15-satellite 17 interface, that is, it is capable of supporting the largest loads possible with smaller interface diameters. This is achieved by optimising the equation defining the relationship between the capacity of supporting axial flows induced by launcher and satellite loads and radial flows induced on the band-clamp system by the pretension thereof. This equation is in its first approximation $Øa=Ør/2\times(tag\alpha-\mu)$, where:

$Øa$=maximum axial flow the interface preloaded by the band-clamp could support.

$Ør$=radial flow induced in the clamps by tightening the band.

$\alpha$=average angle of both contact angles of the clamp wedge with the interface rings.

$\mu$=contact friction coefficient.

Therefore, for a band-clamp type joining system in which the wedge angle and the contact friction coefficient are fixed, the only variable which allows increasing system capacity is increasing the radial flow induced on the clamp, and therefore any design element which improves the capacity of inducing radial flow, of maintaining it, or of reducing its variations along the interface perimeter, will result in a direct improvement of the capacity thereof.

According to the invention the radial flow, which is really the objective sought when tightening, is directly induced, generating a force F in a radial direction on the clamp 13 of length Lm, that is, a radial flow Fm of value $Ør=F/Lm$ by means of screws 19 which advance resting on the band 11 and pushing the clamps 13.

The radial flow Fm on the clamps 13 produces, as a reaction, an opposite radial flow Fb on the band 11, which generates its tightening. That is, that tension here is a consequence of the radial flow created in order to push the clamp 13 and not the other way round.

FIGS. 2 and 3 show a band 11 provided with three through drill holes 23 for each clamp 13 with nuts 21 for three screws 19. The screws 19 are threaded in the nuts 21 and the preloading starts once they reach the clamp 13.

The preloading effect may be seen in FIG. 4, which shows the same section before and after preloading. It can be observed here how the separation between the clamp 13 and the band 11 increases due to the effect of the force of the pushing screw 19 on the clamp 13 and its reaction on the nut 21 resting on the clamp 13 (line L helps to perceive the different relative separations between the different elements in both positions). Interface rings 15, 17 are thus preloaded, at the same time as the band 11 is tightened by reaction. All this is performed without any kind of relative movement between the band 11 and the clamps 13 or between the clamps 13 and the interface rings 15, 17, in a tangential direction. Therefore there are no tension losses due to friction.

The force that has to be generated with the screw to create preloads equal to those created with a conventional system tightened at a tension T is therefore $F=Lm\times T/R$, R being the interface radius.

Taking into account that in order to generate that force F a screw with gauge D with transmission effectiveness C is required, to which screw a tightening torque M with value $M=C\times F\times D$ is applied.

In order to cover the length of the interface with clamps of length Lm, the number N of clamps necessary is $N=2\times\pi\times R/Lm$.

And assuming one screw per clamp, the number of screws necessary is $N=2\times\pi\times C\times D\times T/M$.

To give an idea of the compared effectiveness of the proposed system, if a band has to be tightened to, for example, T=60000 N, with screws of effectiveness C=0.2 and gauge D=8 mm, limiting the tightening torque to 10 N×m (10000 N×mm) 60 screws would be needed. With this number of screws, tightening on an interface of radio R=600 mm requires pushing 60 clamps of length Lm=62 mm (or 30 clamps of length 124 mm pushed by two screws each).

This tightening mechanism is completely different to the classical tightening mechanisms used in conventional clamp/band systems. In these systems, a metal band located about the clamps which also compress the adapter/satellite joining interface is tightened, either mechanically pulling from both its ends or thermally, heating it, joining its ends and subsequently allowing it to cool, or with a combination of both. In all these cases, what is intended with this tightening in the band direction, that is, what will be hereinafter called the tangential direction to the interface, is to induce a load flow on the clamps and from these onto the joining interface, in a perpendicular direction to the band, that is, what will be hereinafter called the radial direction. The value of this radial flow $Ør$ induced by the tangential tension T is directly proportional to the tension and inversely proportional to the radius R of the interface, that is, $Ør=T/R$.

The fundamental difference with a conventional mechanical tightening system is that in the latter it is necessary to increase the tension (To) in the ends from which it is pulled, in order to compensate the losses produced by friction due to the tangential movement between the band and the clamps, which are quantified by the law $T(\theta)=To\times e^{-\mu\theta}$, where $\mu$ is the friction coefficient and $\theta$ is the angle at which tension is measured with respect to the tightening point. Thus, in order to achieve the same 60000 N on the end ($\theta=\Pi$ radians) opposite to the tightening end, if the friction coefficient is $\mu=0.1$, it would be necessary to apply 82000 N on the tightening end, that is, losses close to 30% would occur.

In contrast, with the proposed system these losses would be nonexistent as there is no tangential movement between the band and the clamps. The only factor reducing performance arises due to the effectiveness of the screw itself, which depends on friction, but this factor is already included in the tightening torque calculations with value C.

In the case of the band tightened by thermal hooping disclosed in Spanish patent 2 131 476, the radial flow is achieved by the hooping stress produced in the contact interface between the band and the rings that it joins when the former is contracted on the latter. The system does not have the losses described above because there is no tangential movement between the band and the rings. However, there is a loss of effectiveness in the hooping due to allowances and play between the elements forming the interface, the lack of circular, local and global homogeneity and its lack of rigidity, which requires an initial mechanical tightening in order to bring the ends of the band closer together before closing it and absorbing all these imperfections, or otherwise it would be necessary to raise the band temperature enough to compensate all the allowances and flexibilities. On the other hand, since the materials used in building the structural interface and the band, both of these normally in aluminium, have a limited heat expansion coefficient, it is only possible to increase the target tension by increasing the hooping temperature, which in turn has a limit due to the drop in the mechanical properties of these materials.

An additional advantage of the proposed system is that the preloading is induced in each clamp independently to the rest, which allows obtaining a radial flow distribution as uniform as desired, correcting deviations that the interface rings may have on the nominal geometry.

Another additional advantage of this system is that in order to start tightening it is only necessary that the terminal ends of the band are locked. This is what allows that the initial position of the closing mechanism proposed herein is not conditioned by the system tightening requirements or vice versa. Or in other words the mechanism design is independent of the band design and vice versa. This independence provides the following features, among others:

The closing mechanism is not used to tighten the band, as in patent no. 2 131 476, which would force inducing a tangential movement of the terminal ends of the band during tightening, and therefore defining friction features in the band which are compatible with this function.

The main parameters of the mechanism are chosen according to the need to dampen the shock. Therefore the starting angle of the mechanism, the length of its elements and the mechanism mass are determined such that the desired feature, which is the deployment dynamics, and its main consequence, the induced shock, is optimised.

The selection of the mechanism parameters is valid for any band tension subsequently applied and also for any band diameter.

The installation of the system starts with the mechanism and the band in a relaxed state, without loads induced either by band tension or by mechanism position, which allows positioning the measuring and control elements much more adjusted to the initial zero.

The controlled opening mechanism of the opening-closing device in the band will now be described with respect to FIGS. 5-9.

The deployment dynamics of the controlled opening mechanism has an essential influence on the performance desired from this device. As has been mentioned above, the practical limit on the increase in capacity of the band 11-clamps 13 assembly by increasing radial flow is that the sudden relaxation of the band tension induces in turn a sudden relaxation of the elastic energy accumulated in the interface rings 15, 17. This elastic energy is transformed into the kinetic energy of these rings, which being circularly continuous acts as a system of circularly distributed springs and masses and vibrating on either side of its initial state. This vibration, which is a short-lasting transient signal and has components of different acceleration in the whole frequency spectrum, is what the satellite perceives as a separation-induced shock. This shock may damage the satellite equipment after certain acceleration levels. These acceleration levels depend on the energy that has suddenly been released, which in turn is a direct function of the preloading degree existing at the time of the release. The sensitivity of the satellite equipment to the vibratory signal induced by the separation thus limits the maximum preload of the system and thus its capacity.

Of all the interface ring vibration modes which are excited when suddenly releasing the elastic energy, the most important one, because it is the one which corresponds with the greatest acceleration and in turn determines the rest of the spectrum, is that called ring breathing mode. This mode is the result of an in-phase vibration of all the ring sections, as if an expansion and contraction of the initial ring radius occurred. The frequency of this vibration and the maximum acceleration corresponding to this vibration mode may be easily related with the preloading the system has before sudden release. For this the hypothesis that the accumulated elastic energy accumulated in the interface ring when a certain uniform radial flow is induced therein is transformed into kinetic energy of the ring in this breathing mode, is assumed. The relationship between induced radial acceleration and band tension is $Ar=0.5T/(R \times A \times \rho)$, $Fr=(E/\rho)^{0.5}/(2 \times \pi \times R)$, wherein:

$Ar$=is the radial acceleration induced in the axial symmetry mode of the ring $Fr$=is the frequency of the axial symmetry mode or the breathing mode $T$=is the band tension at the time of sudden release $E$=is the elastic modulus of the ring material $R$=is the mean radius of the satellite interface ring $A$=is the area of the cross section of the satellite ring $\rho$=is the volumetric density of the satellite ring It can be seen with the above expressions that the shock acceleration induced in separation is directly proportional to the tension existing at the time of sudden release of this tension, whereas the frequency of the vibratory movement depends only on the interface ring diameter.

The only way of reducing the induced shock is therefore reducing the band tension, but this is at the expense of the system capacity, as has been previously reflected.

According to the invention relaxation of the band tension is performed in two phases:
  a first phase during which band tension slowly decreases to a residual value,
  a second phase in which relaxation of the residual tension is sudden or very fast.

During the first phase, which will be called the slowing down phase, the system made up by the band and the interface ring will move together so that contact of the band with the ring prevents the latter from vibrating freely in its breathing mode. For this it is further necessary that the elastic energy that is being released in this phase is absorbed or transformed by some system element. When this phase finishes the system will retain a residual energy and the band will also have a residual tension.

During the second phase the band will separate from the interface ring allowing the latter to vibrate freely in its natural breathing mode. The residual tension of the band and the residual energy of the ring will define the final features of the system, that is the shock that will be finally induced and the complete opening in order to assure satellite exit. The faster this second phase is the greater the guarantee of non-disturbance of the satellite release.

Optimization in relaxation times for each phase will produce the benefit of reducing the shock without having to reduce system capacity and without disturbing satellite release. In order to manage the times for each phase some type of mechanism is needed to control these times, i.e. it transforms the sudden relaxation produced in a conventional system of the type that cuts a bolt by means of a pyrotechnic cutter, into a controlled relaxation in the two phases set forth.

Figure 5A:
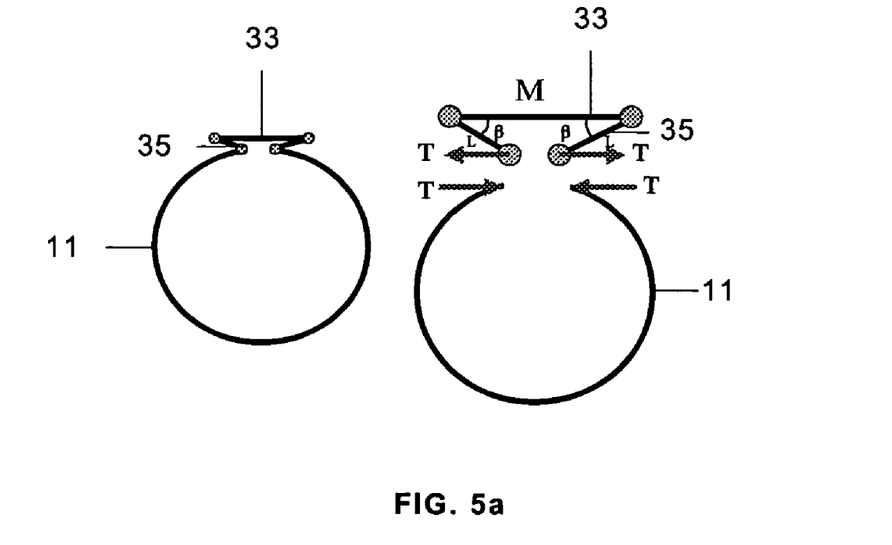
FIGS. 5a and 5b schematically show the working principle of the controlled opening mechanism of a launching vehicle and satellite connection apparatus according to the present invention.
Figure 5B:
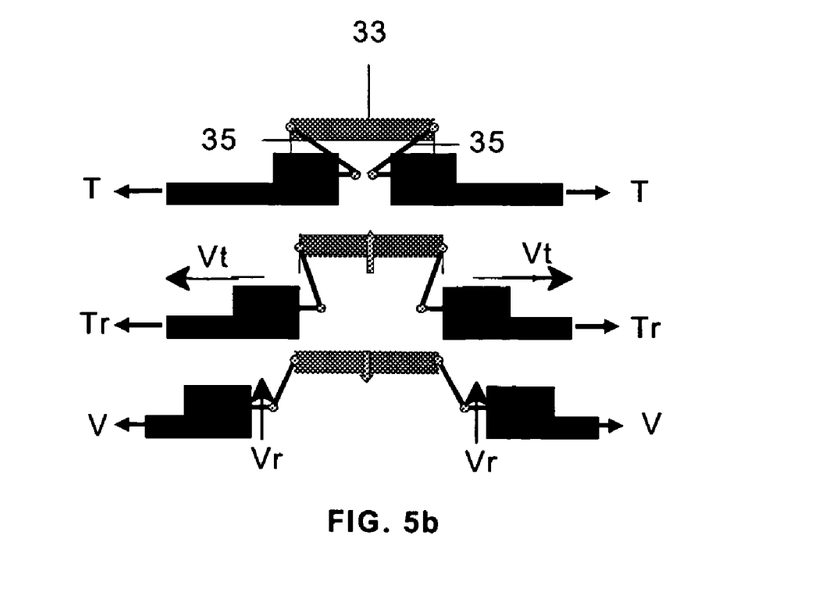

The invention thus provides a mechanism responsible for allowing a controlled opening of the band such that it optimises the ratios of both opening phase times, performing a slowing down phase in which the opening delay time may be controlled, and a final opening phase in which the movement may even be accelerated. The manner in which this double object is achieved is by means of the mechanism shown schematically in FIG. 5, a mechanism with four articulations connected by three rigid elements: a central support 33 running parallel to the band 11 and two side connecting rods 35 forming an angle β with the central support.

Whereas the support 33 has its movement locked by a retaining element, such as the previously mentioned bolt, the mechanism is capable of transmitting the loads from one side thereof to the other through the two connecting rods 35. When the support 33 is released, the tension T in the band moves the mechanism such that the angle thereof increases and the support 33 is shifted outwards increasing the tangential velocity Vt up to a maximum which corresponds to a certain angle close to which the tension has been completely relaxed, with only the residual tension Tr remaining. From here the support 33 decelerates until it changes its speed. At this moment the inertia thereof performs the opposite effect to the initial one, helping the release of the band in the radial direction at a velocity Vr.

The parameters determining the system dynamics and therefore its final features are:
 L=Length of the connecting rods 35
 β=Angle of the connecting rods 35 with the support 33
 M=Mass of the support 33

The length of the connecting rods 35 has a positive effect due to the mandatory kinematics. The longer they are, the path of the articulation connecting the band 11 and the connecting rod has a tangential component which is very small at the beginning and then increases. This is desirable in the slowing down phase. However, the maximum possible length is limited because it in turn defines the band diameter after the opening and this may not exceed the limits imposed by the satellite.

The smaller the initial angle is, the slower the initial separation will be for the same kinematic reason as above, i.e. the slowing down will be more effective. The angle of the mechanism may by zero, which would correspond to an equilibrium position, but it has an earlier practical limit in order to assure the release taking into account the friction forces.

Finally the mass M of the support, disregarding the effect of the rest of the moving masses, is that which best determines the band release dynamics. The greater the mass M, the more energy will be absorbed in proportion to the square of the velocity, and the more inertial force opposing the movement it will impose and propagate through the connecting rods to the articulated ends of the band, slowing down its release. The limit of this mass is only a matter related with the aims of total system weight.

Figure 6A:
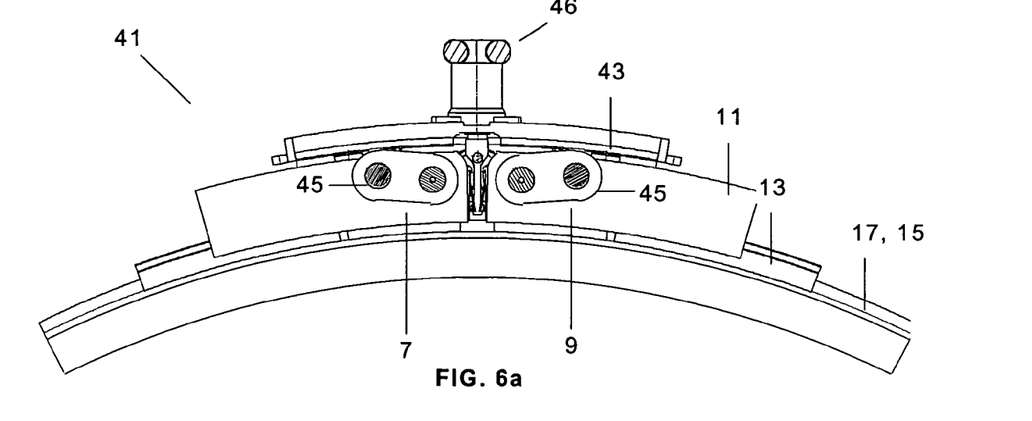
FIGS. 6a, 6b and 6c show, respectively, the opening-closing device of a launching vehicle and satellite connection apparatus according to a first embodiment of the present invention at the beginning of opening, at the time in which the separation of the band from the rings starts and in the final parking position.
Figure 6B:
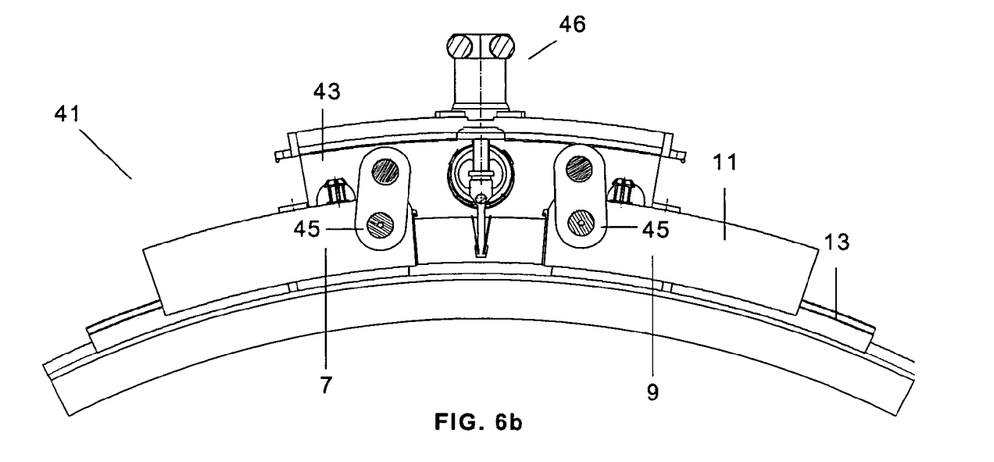
Figure 6C:
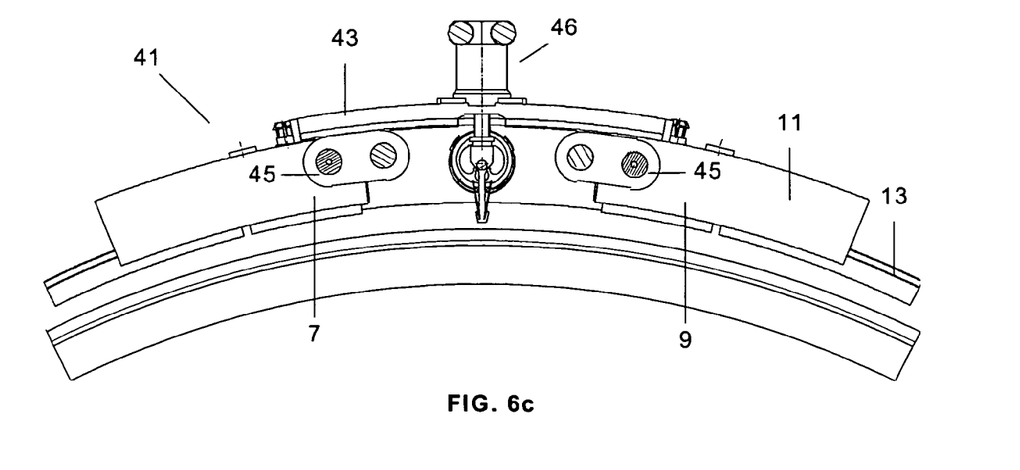
Figure 7A:
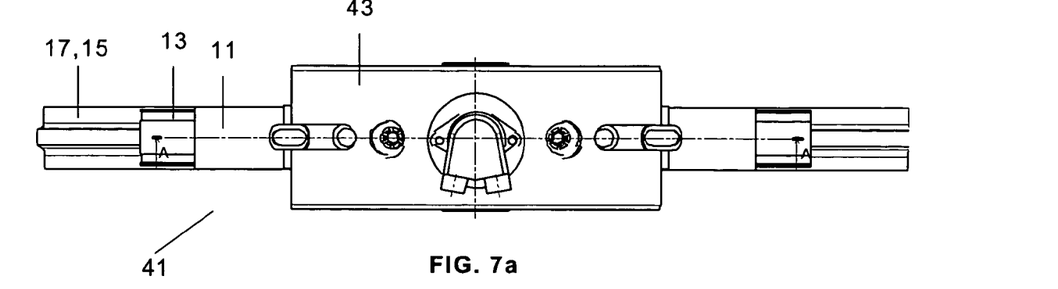
FIGS. 7a, 7b and 7c show different views of the opening-closing device of a launching vehicle and satellite connection apparatus according to a first embodiment of the present invention.
Figure 7B:
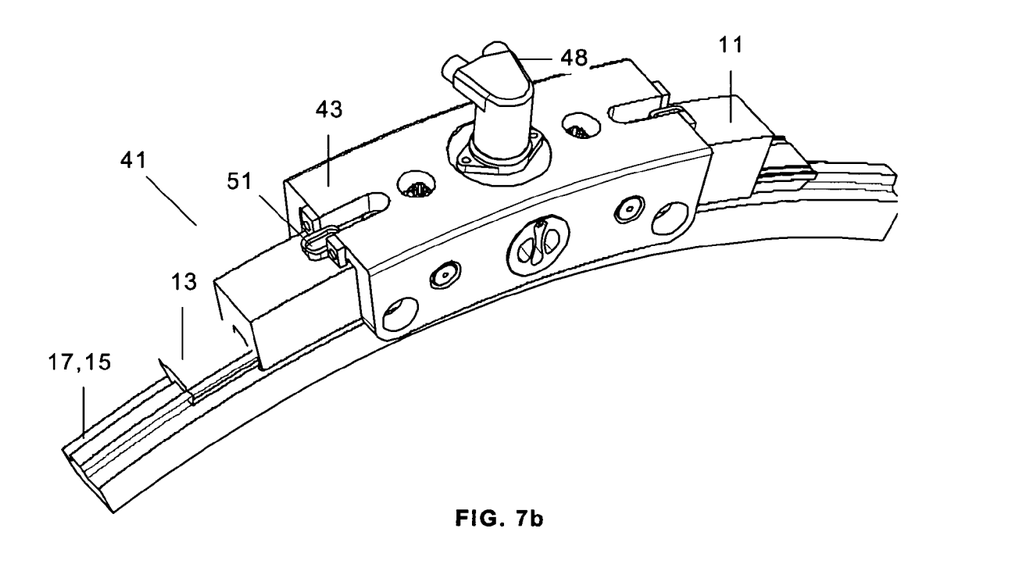
Figure 7C:
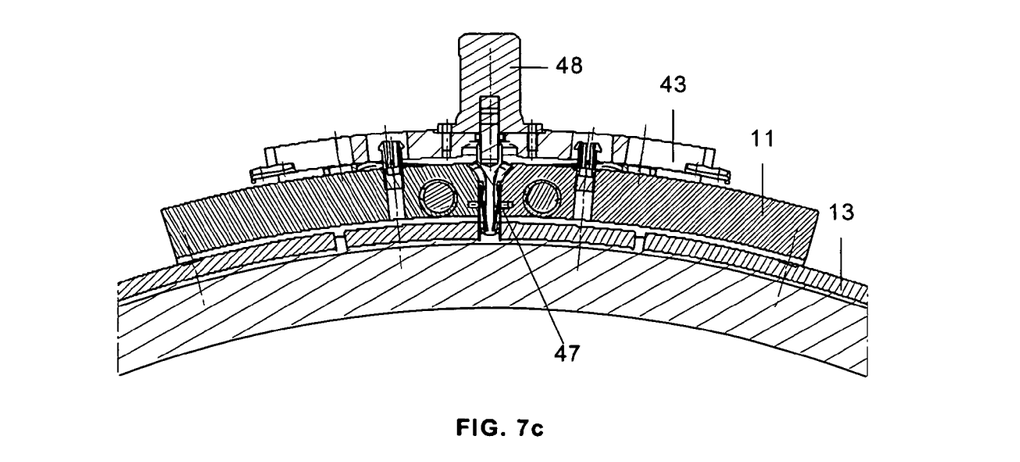

FIGS. 6 and 7 show the opening-closing device 41 with a first embodiment of the controlled opening mechanism in three positions. The opening device 41 comprises a conventional mechanism 46 for opening-closing of the band 11 including a retaining element such as, for example, a bolt 47 which joins the ends of the band and which may be released at the time of separating the satellite from its launcher by means of for example a pyrotechnic cutter 48, and the controlled opening mechanism is formed by a support 43 connected in an articulated manner to the two ends 7, 9 of the band by means of the connecting rods 45.

In the first of the positions mentioned, from top to bottom, the starting position is represented, before the command for separating the satellite from the launcher vehicle, with the ends 7, 9 of the band very close together. The second is an intermediate position in which the band 11 has not yet separated from the interface rings 15, 17, but in which its tension has relaxed given that the ends 7, 9 have separated. Finally, the third shows the final position, also called the parking position, in which it can be observed that the band 11 is completely separated from the interface rings 15, 17 and therefore the satellite release is free.

Following FIG. 7 it can be observed that the support 43 has a curved shape with a C section and that it has interfaces for assembling the connecting rods 45 with their shafts as well as other device elements such as the pyrotechnic nut 48 responsible for receiving the separation command and for releasing the retainer 47 which locks the mechanism movement, and a pair of clips 51 responsible for fixing the mechanism with respect to the band in its parking position.

Figure 8A:
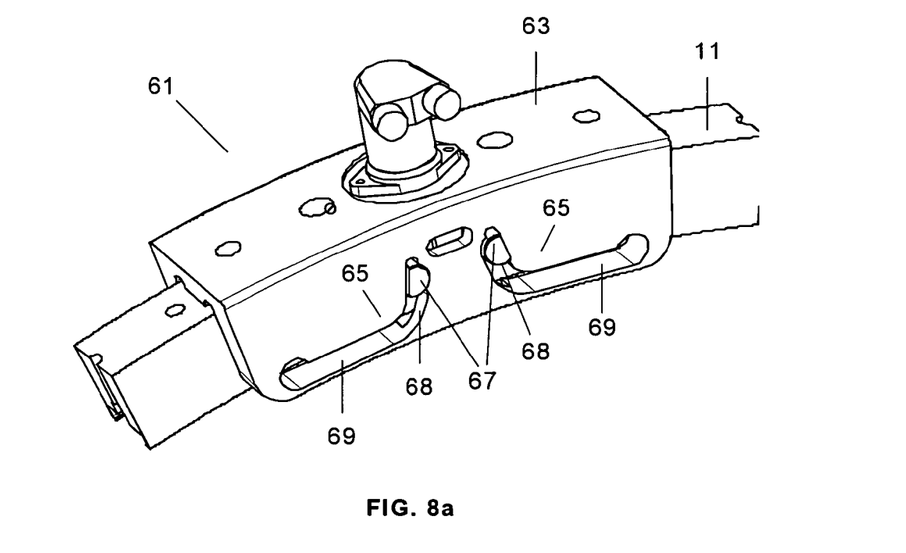
FIGS. 8a and 8b show, respectively, the opening-closing device of a launching vehicle and satellite connection apparatus according to a second embodiment of the present invention at the beginning of opening, and in the final parking position.
Figure 8B:
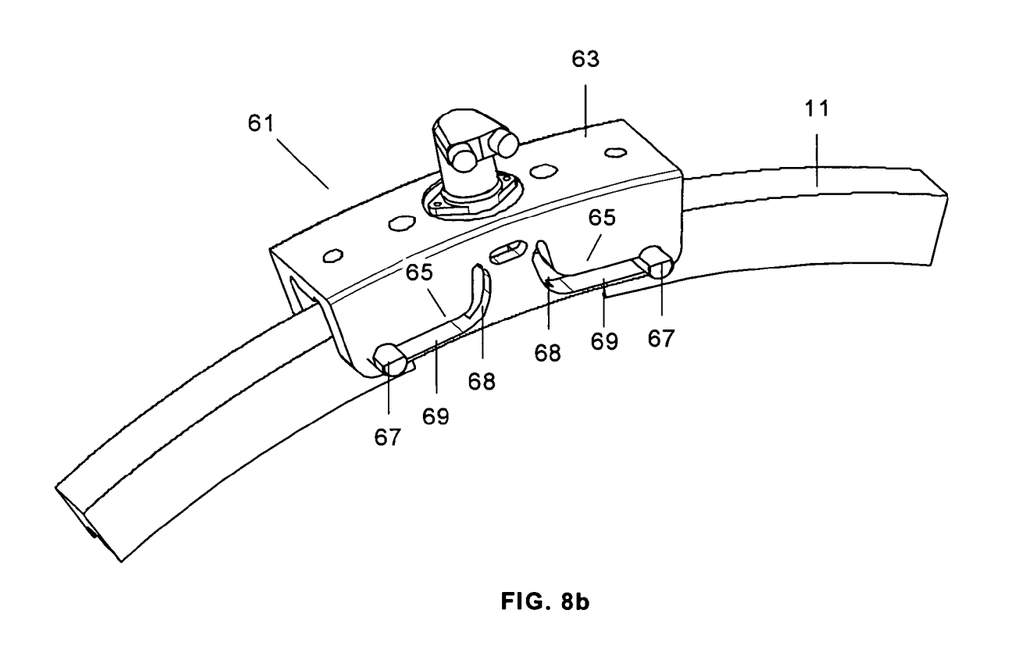

Following FIGS. 8a and 8b a second embodiment of the controlled opening mechanism will now be described.

The opening-closing device 61 includes in this case a support 63 including two grooves 65 defining the movement that two shafts 67 associated to the ends of the band 11 must follow. The shape and size of the grooves 65 are designed such that they have two sections 68, 69 of different slope and with a transition between them. The first section 68 is defined with a very steep slope in order to slow down the separation movement of the ends of the band 11. The angle formed by this section with a vertical line is a design parameter equivalent to the initial angle of the connecting rod in the first embodiment of the invention. The smaller this angle is the slower the initial separation will be. Kinematic compatibility forces the main support to shift vertically, i.e. outwards, in order to allow the separation of both shafts. For this it is necessary to invest the corresponding kinetic energy, which is proportional to its mass and the square of the velocity of such mass, in the movement of such support. Therefore, there is a dissipation and slowing down mechanism completely equivalent to that of the mechanism of the first embodiment of the invention. The second section 69 of the groove 65 is defined such that the movement is accelerated which is required in order to park the system at the desired time. The transition between both is made by means of a curve defining the transition movement. The end of the run on the groove defines the open mode of the band, i.e. its geometry with respect to the closed mode.

Another way of understanding the mechanism is the following. The horizontal distance between the shafts when these are at the beginning of the first section of the groove corresponds to the system at its maximum tension. The horizontal distance between them when they are at the end of the first section corresponds to the system at its minimum tension, it may particularly be zero if so required. The difference in the distances is that required for tightening and loosening the system. The length of this section must be passed through by the shafts between these two positions and by reaction by the support, and therefore along with the support mass and the tension, it defines the time by which the tension is reduced from the initial tension to the final tension, therefore the slowing down time. The second section is defined so that between the point of minimum tension and the final point of this second section the separation of the band from the interface rings and its parking in the open mode diameter occurs.

In short, the design of the groove 65 allows managing the movement that will be obtained and therefore the dynamics of the separation and consequently the shock induced by the latter.

As in the first embodiment of the invention, the reference device, this other embodiment has to have the elements which allow locking and unlocking the relative movement between the main support and the band, and as they are equivalent exactly the same components as described above may be used.

In the same manner, the tightening system must allow defining a starting position without altering it or depending on it. This starting position is precisely that which positions the shafts at the start of the first section. From this position the tightening may be started with the same process defined for the reference system, that is bringing the clamps close to the interface rings by means of pusher screws.

Figure 9A:
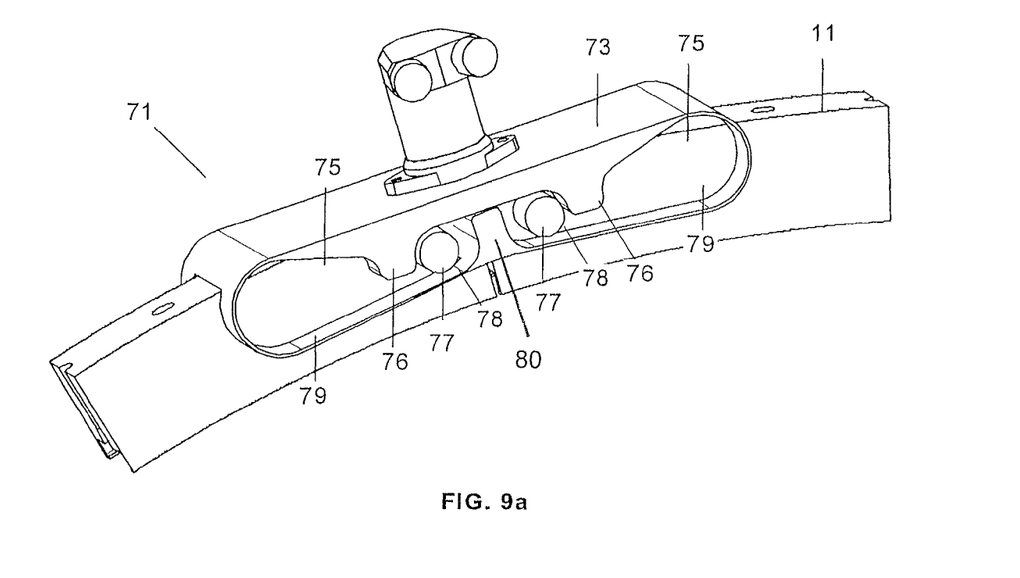
FIGS. 9a and 9b show, respectively, the opening-closing device of a launching vehicle and satellite connection apparatus according to a third embodiment of the present invention at the beginning of opening, and in the final parking position.
Figure 9B:
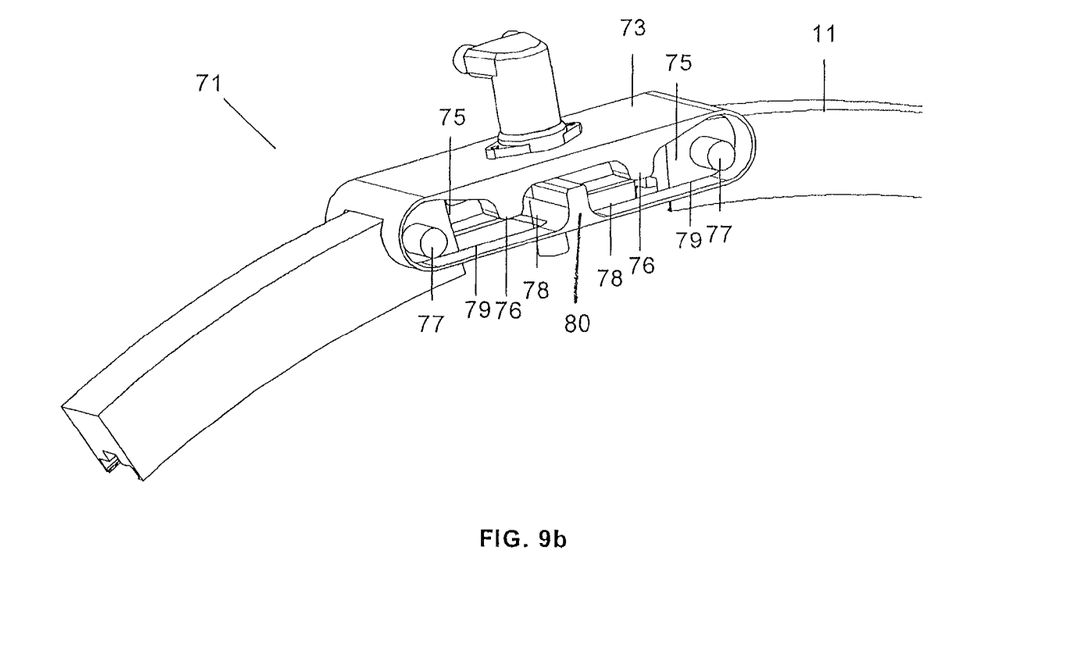

A third embodiment of the controlled opening mechanism is now described following FIGS. 9a and 9b.

The opening-closing device 71 includes in this case a support 73 including two grooves 75 which define the movement that two shafts 77 associated to the ends 7, 9 of the band 11 must follow. A nub 80 is disposed between the shafts 77.

The support 73 has certain elasticity which allows managing the times of two sections similar to those of the previous embodiment. For its part, the opening-closing device 71 contains similar locking and unlocking elements.

In this case, the support 73 is the only metal part which, due to its elasticity and the presence of a separator 76 in each groove 75, allows two positions 78, 79 of its lower portion. In one of these, that corresponding to its natural position 79 (open position), it leaves a sufficient allowance for the shafts 77 to pass through it. In the other, that corresponding to its deformed position 78 (closed position), this allowance is cancelled by deforming it until it touches the upper part and retaining it in that position by the preload exerted by a screw which is kept joined to the pyrotechnic nut which will activate the separation.

Starting from this last position, the movement of the shafts 77 is locked, whereas the pyrotechnic nut retains the associated screw. When the separation command is given, the shafts follow the sloping wall that retained them the angle and length of which define tension relaxation and the slowing down time in the same manner as in the grooved mechanism. When they reach the released opening they shift rapidly in a horizontal movement until they are retained by the end of the support 73.

Although the present invention has been described entirely in relation with preferred embodiments, it is obvious that these embodiments are not limiting, it being possible to introduce modifications comprised within the scope defined by the following claims.

The invention claimed is:

1. In a launcher and satellite connection-separation apparatus for launching satellite vehicles, the launcher and satellite connection-separation apparatus comprising a band-clamp assembly having a band (11) with an inner channel in which a plurality of clamps (13) are located in a sliding manner for application to rings (15, 17) interfacing between the vehicles, and a union-separation device (41, 61, 71) on ends (7, 9) of the band including a locking element (47) and means (48) for unlocking the locking element, the improvements comprising:
    a) means (19) for radially tightening the band; and
    b) a mechanism in the union-separation device (41, 61, 71) for a controlled opening of the band (11) in first and second phases, the ends (7, 9) of the band (11) shifting contact with the rings (15, 17) in the first of the phases for dissipating by friction elastic energy corresponding to the tightening of the band (11) and, in the second of the phases, the band (11) separating from the rings (15, 17) until reaching a parking position,
    wherein the union-separation device (41) also comprises a support (43) of mass M and two connecting rods (45) respectively connecting the mass to the ends (7, 8) of the band (11) in an articulating manner such that, once the locking element (47) is unlocked, the ends (7, 8) of the band (11) shift in the first of the phases tangentially to the rings (15, 17) for the dissipating of the elastic energy corresponding to the tightening of the band (11), the support (43) moving substantially radially away from the band (11) in the first phase, and, in the second of the phases, shift in a radial direction to the rings (15, 17) until reaching the parking position.

2. A launcher and satellite connection-separation apparatus according to claim 1, wherein said means for radially tightening the band-clamp assembly consist of a plurality of pushing elements (19) for the clamps (13) arranged along their perimeter.

3. A launcher and satellite connection-separation apparatus according to claim 2, wherein said pushing elements (19) consist of screws (19) which cooperate with nuts (21) located in through drill holes (23) arranged on the band (11).

4. A launcher and satellite connection-separation apparatus according to claim 3, wherein the number of screws (19) per clamp (13) is from 1 to 3.

5. In a launcher and satellite connection-separation apparatus for launching satellite vehicles, the launcher and satellite connection-separation apparatus comprising a band-clamp assembly having a band (11) with an inner channel in which a plurality of clamps (13) are located in a sliding manner for application to rings (15, 17) interfacing between the vehicles, and a union-separation device (41, 61, 71) on ends (7, 9) of the band including a locking element (47) and means (48) for unlocking the locking element, the improvements comprising:
    a) means (19) for radially tightening the band; and
    b) a mechanism in the union-separation device (41, 61, 71) for a controlled opening of the band (11) in first and second phases, the ends (7, 9) of the band (11) shifting contact with the rings (15, 17) in the first of the phases for dissipating by friction elastic energy corresponding to the tightening of the band (11) and, in the second of the phases, the band (11) separating from the rings (15, 17) until reaching a parking position,
    wherein the union-separation device (61) also comprises a support (63) of mass M with two guide grooves (65) respectively for shafts (67) joined to the ends (7, 8) of the band (11) so that, once the locking element (47) is unlocked, the shafts (67) shift in the first of the phases along first parts (68) of the guide grooves (65) for the dissipating of the elastic energy corresponding to the tightening of the band (11) and, in the second of the phases, shift along second parts (69) of the guide grooves (65) for guiding the band (11) to the parking position.

6. A launcher and satellite connection-separation apparatus according to claim 5, wherein said means for radially tightening the band-clamp assembly consist of a plurality of pushing elements (19) for the clamps (13) arranged along their perimeter.

7. A launcher and satellite connection-separation apparatus according to claim 6, wherein said pushing elements (19) consist of screws (19) which cooperate with nuts (21) located in through drill holes (23) arranged on the band (11).

8. A launcher and satellite connection-separation apparatus according to claim 7, wherein the number of screws (19) per clamp (13) is from 1 to 3.

9. In a launcher and satellite connection-separation apparatus for launching satellite vehicles, the launcher and satellite connection-separation apparatus comprising a band-clamp assembly having a band (11) with an inner channel in which a plurality of clamps (13) are located in a sliding manner for application to rings (15, 17) interfacing between the vehicles, and a union-separation device (41, 61, 71) on ends (7, 9) of the band including a locking element (47) and means (48) for unlocking the locking element, the improvements comprising:

a) means (19) for radially tightening the band; and b) a mechanism in the union-separation device (41, 61, 71) for a controlled opening of the band (11) in first and second phases, the ends (7, 9) of the band (11) shifting contact with the rings (15, 17) in the first of the phases for dissipating by friction elastic energy corresponding to the tightening of the band (11) and, in the second of the phases, the band (11) separating from the rings (15, 17) until reaching a parking position, wherein the union-separation device (71) also comprises a support (73) of mass M with grooves (75) configured so that shafts (77) joined to the ends (7, 8) of the band (11) may be located in first and second positions (78, 79), a nub disposed between the shafts (77), such that once the retaining element (47) is unlocked, the shafts (77) shift away from each other in the first of the phases from the first of the positions (78) to the second of the positions (79) overcoming resistance presented by respective separators (76) for the dissipating of the elastic energy corresponding to the tightening of the band (11), the nub moving radially with respect to the support (73) to assist the shafts (77) in moving tangentially and in overcoming the resistance presented by the respective separators (76) to allow the separation, and, in the second of the phases, shift along the second of the positions (79) to the parking position.

10. A launcher and satellite connection-separation apparatus according to claim 9, wherein said means for radially tightening the band-clamp assembly consist of a plurality of pushing elements (19) for the clamps (13) arranged along their perimeter.

11. A launcher and satellite connection-separation apparatus according to claim 10, wherein said pushing elements (19) consist of screws (19) which cooperate with nuts (21) located in through drill holes (23) arranged on the band (11).

12. A launcher and satellite connection-separation apparatus according to claim 11, wherein the number of screws (19) per clamp (13) is from 1 to 3.

\* \* \* \* \*